B. J. BROUWER.
POTATO CLEANING APPARATUS.
APPLICATION FILED NOV. 17, 1909.
986,681.
Patented Mar. 14, 1911.
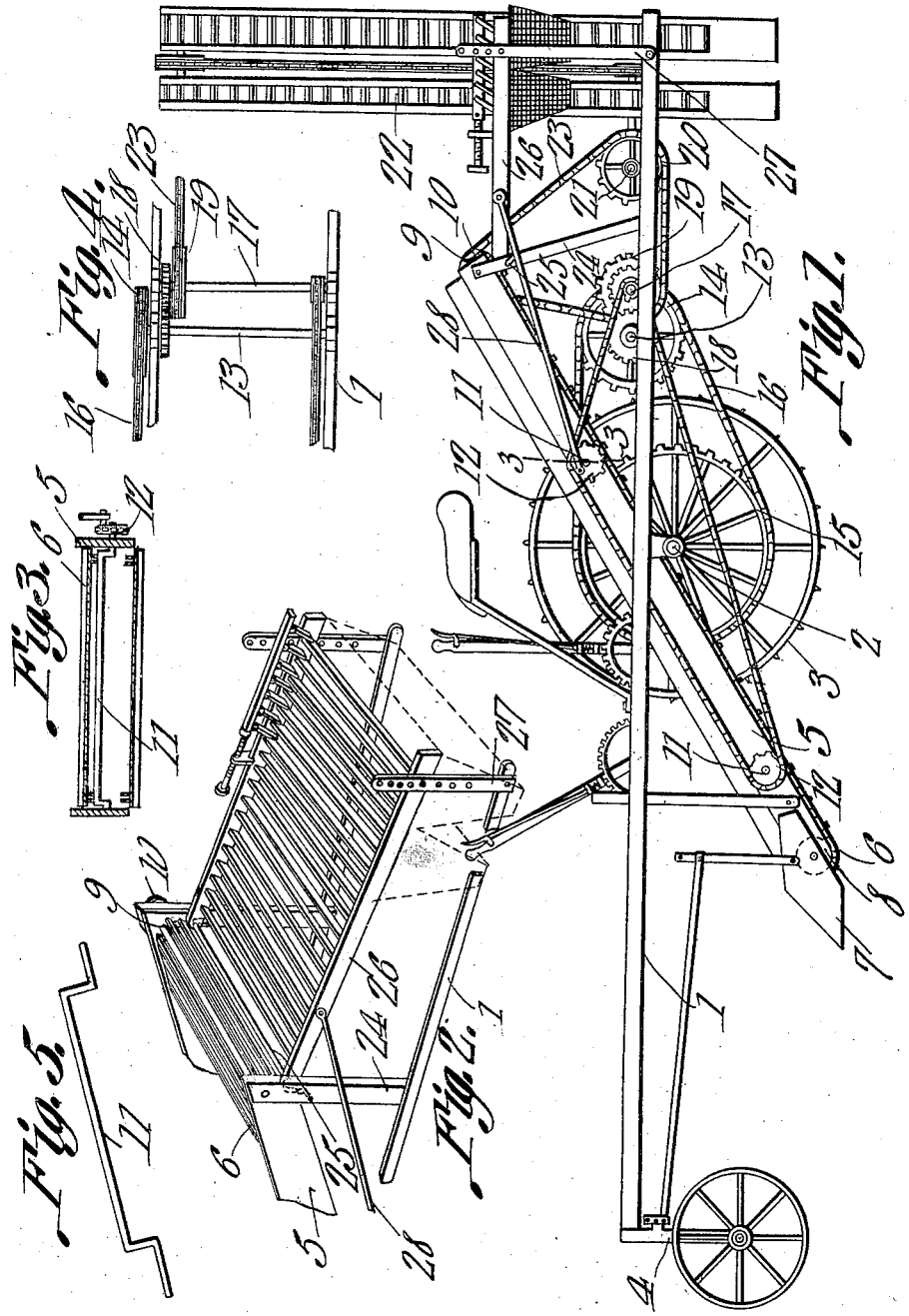
Witnesses
Bertus J. Brouwer,
Inventor
by C. A. Snow & Co.
Attorneys

UNITED STATES PATENT OFFICE.

BERTUS J. BROUWER, OF CAMPBELL, MINNESOTA.

POTATO-CLEANING APPARATUS.

986,681.	Specification of Letters Patent.	Patented Mar. 14, 1911.

Application filed November 17, 1909. Serial No. 528,577.

*To all whom it may concern:*

Be it known that I, BERTUS J. BROUWER, a citizen of the United States, residing at Campbell, in the county of Wilkin and State of Minnesota, have invented a new and useful Potato-Cleaning Apparatus, of which the following is a specification.

This invention has relation to a potato cleaning apparatus and consists in the novel construction and arrangement of its parts as hereinafter described and claimed.

The object of the invention is to provide a simple and effective machine for agitating, cleaning, and sorting potatoes and to operatively connect the parts together in such manner that a compact and readily managed structure is provided.

In the accompanying drawings,—Figure 1 is a side elevation of the potato apparatus. Fig. 2 is an enlarged perspective view of the sorter forming a part of the potato apparatus. Fig. 3 is a transverse sectional view of the elevator of the apparatus cut on the line 3—3 of Fig. 1. Fig. 4 is a top plan view of a master shaft used upon the apparatus and adjacent parts. Fig. 5 is a perspective view of an agitator used upon the apparatus.

The apparatus includes a frame 1 which is mounted at a point intermediate its ends upon an axle 2 supported by traction wheels 3. A truck 4 supports the forward portion of the frame 1. An elevator trunk 5 is mounted upon the intermediate portion of the axle 2 and an endless conveyer 6 is mounted for movement longitudinally of the said trunk in the usual manner. A digging share 7 is located at the lowed forward end of the trunk 5. A rotating member 8 is journaled at the lower forward end of the trunk 6 and a rotating member 9 is journaled at the upper rear end of the said trunk. A sprocket wheel 10 is fixed to the member 9. The endless conveyer 6 is guided around the members 8 and 9 in the usual manner. Crank shafts 11 are journaled at their end portions in the sides of the trunk 5 and are located between the upper and lower runs of the conveyer 6. Sprocket wheels 12 are fixed to the ends of the crank shafts 11 and are located beyond the outer surface of one of the sides of the trunk 5. A master shaft 13 is journaled upon the frame 1 and is provided with a sprocket wheel 14. A sprocket rim 15 is attached to the side of one of the traction wheels 3 and a sprocket chain 16 passes around the sprocket wheels 14 and 15 and is adapted to transmit rotary movement from the traction wheel to the master shaft 13. A countershaft 17 is journaled for rotation upon the frame 1 and is operatively connected with the master shaft 13 by means of intermeshing gear wheels 18, one of which is mounted upon the master shaft and the other upon the counter shaft. A sprocket wheel 19 is fixed to countershaft 17 and a sprocket wheel 20 is fixed to a shaft 21 also journaled upon the frame 1. The shaft 21 is designed to operate a conveyer in an elevator 22, but as the said elevator and its attached parts form no portion of the present invention, it is thought that further allusion to the same is unnecessary. A sprocket chain 23 passes around the sprocket wheels 10, 19 and 20 and is adapted to transmit movement from the countershaft 17 to the conveyer 6.

Arms 24 are mounted upon the frame 1 and at their upper ends support the rear portion of the trunk 5. A crank shaft 25 is journaled at its ends in the arms 24 and one end of a sorter 26 is mounted upon the intermediate crank portion of the said shaft 25. Arms 27 are pivotally connected at their lower ends with the rear portion of the frame 1 and the rear portion of the body of the sorter 26 is adjustably connected with the upper ends of the arms 27. A pitman 28 is pivotally connected at its rear end with the body of the sorter 26 and is eccentrically pivoted at its forward end to the side of the hindmost sprocket wheel 12 attached to the shaft 11 journaled in the trunk 5.

In operation as the machine is drawn along the ground the digging share 7 will pass under the potatoes and elevate the same together with the top soil upon the upper run of the conveyer 6. Most of the soil will sift through the conveyer while the potatoes are carried up, and inasmuch as the crank shafts 11 are rotated as indicated the said crank shafts will strike the upper run of the conveyer and agitate the same, thus facilitating the separation of the soil from the potatoes. Through the pitman 28 the sorter 26 is reciprocated and when the potatoes are delivered upon the same, they are sorted into different grades and deposited in the conveyers 22. Inasmuch as the master shaft 13 and other motion-transmitting device are located under the rear end of the trunk 5 and the sorter 26 is operatively connected with the hindmost agitator shaft 11, a compact assemblage of parts is attained and the machine may be readily handled upon uneven ground and at places where the open space is limited.

Having described the invention what I claim as new and desire to secure by Letters Patent is:—

In a potato cleaning apparatus the combination of a frame with an elevator located thereon, and an agitator for the elevator, said apparatus also having a sorter with its receiving end located below the delivery end of the elevator, arms fixedly mounted upon the frame, and supporting the delivery end of the elevator, a crank shaft journaled in said arms, arms pivoted at their lower ends to the frame, said crank shaft supporting the receiving end of the sorter and the pivoted arms supporting the delivery end of the sorter, and means for operating the sorter from the agitator.

In testimony that I claim the foregoing as my own, I have hereto affixed my signature in the presence of two witnesses.

BERTUS J. BROUWER.

Witnesses:
JULIUS SCHENDEL,
GEORGE W. BROADHUTT.

---

Copies of this patent may be obtained for five cents each, by addressing the "Commissioner of Patents," Washington, D. C."